Patented Oct. 28, 1941

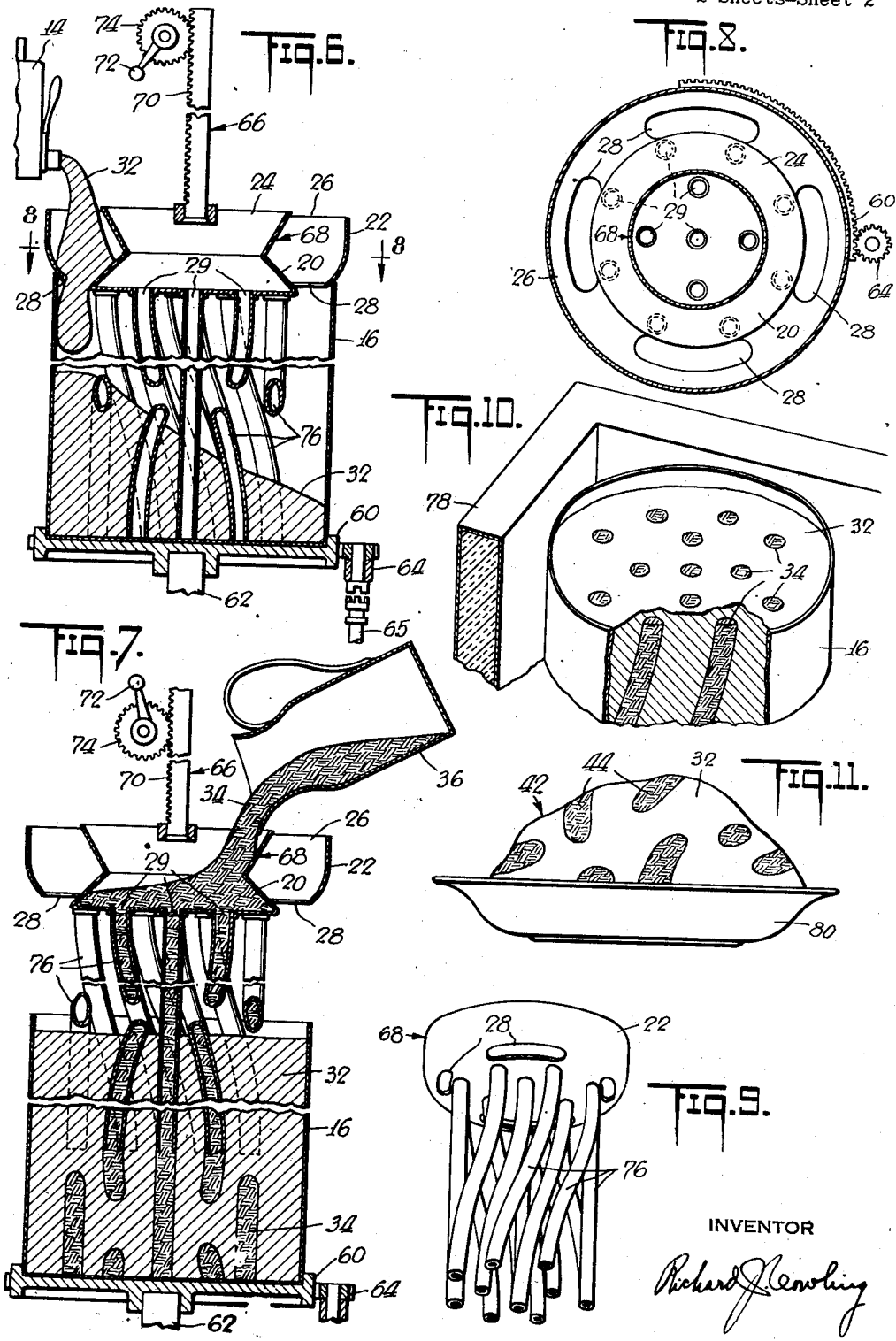

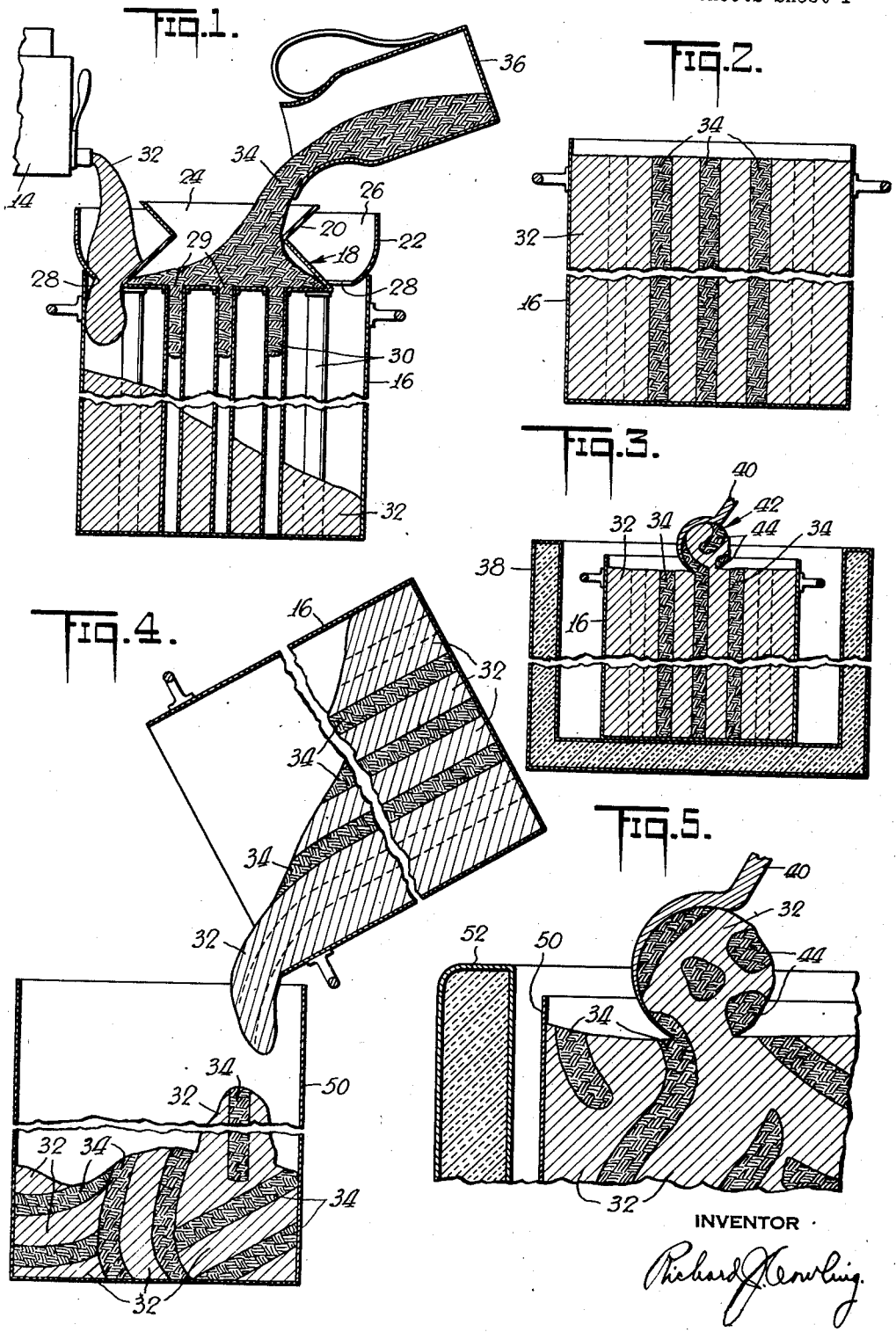

2,260,298

UNITED STATES PATENT OFFICE 2,260,298

METHOD OF AND APPARATUS FOR MAKING VARIEGATED FROZEN EDIBLE PRODUCTS

Richard J. Cowling, Teaneck, N. J., assignor to Joe Lowe Corporation, New York, N. Y., a corporation of Delaware Application October 5, 1939, Serial No. 297,996

9 Claims. (Cl. 107—54)

The present invention relates generally to a method of and apparatus for making a composite frozen edible product, and it has particular relation to the manufacture of a bulk substance, such as sherbet, ice milk, ice cream, frozen custard, or like substances, which has variegations of a flavoring material of a contrasting color dispersed therein and therethrough.

Heretofore, such a product has been made manually by filling a conventional ice cream can or container with the bulk substance, partially freezing the same until it is form-retaining, punching a plurality of spaced holes in such basic substance, filling the holes with a contrasting flavoring material, refreezing the composite mass, and then dispensing the same by scooping or dipping individual servings or portions therefrom with a conventional ice cream scoop or dipper, whereby the flavoring material was dispersed throughout the final serving. While this process was capable of producing a satisfactory product manually, it was too laborious and time-consuming for adoption commercially even in a small ice cream plant where substantial quantities are required at a reasonable cost. In the larger plants, which are equipped with one or more conventional continuous ice cream freezers, the product can be readily produced by combining a specialized extruding head, such as shown and described in Letters Patent No. 2,042,940, issued June 2, 1936, with the continuous freezer, or by combining a plurality of such continuous freezers together and bringing their respective discharges together through a common outlet head. Only a small percentage of the ice cream plants, however, are equipped with such continuous freezers, and only a small percentage of such plants have sufficient volume or gallonage production to warrant the installation of such expensive equipment.

It will be apparent that the foregoing manual process for manufacturing a variegated frozen edible product involves a large number of extra steps or duplicate operations, and requires several time consuming operations and large amounts of equipment, which makes it entirely unattractive to the small ice cream manufacturer who is neither equipped nor has the volume of sales sufficient to warrant the installation of the necessary mechanical apparatus required for manufacturing such a variegated product. All of these disadvantages may be obviated by practicing the present invention, which enables the smaller manufacturer to make a variegated product profitably at a price that is competitive with that of the larger manufacturer and with other standard ice cream products. The following described method and apparatus obviously permits the smaller manufacturer to make a variegated frozen edible product in a continuous operation, with a single handling of the materials throughout, with one hardening operation which requires approximately one-half the number of molds required in a two stage hardening operation, and in about one-half the time required in a two stage hardening operation, and the final product will be found to be substantially identical in appearance, taste and uniformity with the product made on the highly mechanized continuous freezer operation.

An object of the present invention is to provide a new, simple and inexpensive method or process for manufacturing a basic bulk sherbet, ice milk, ice cream, frozen custard, or similar substances, having a flavoring material of a contrasting color dispersed therein and therethrough to produce a composite frozen edible variegated product of the character described.

Another object of the invention is the provision of a simple, efficient, and sanitary method or process for manufacturing a basic bulk edible substance, such as a sherbet, ice milk, ice cream, frozen custard, or similar substances, having a flavoring material of a contrasting color or colors dispersed therein and therethrough to produce a composite frozen edible variegated product.

A further object of the invention is to provide a new and efficient method of injecting or inserting continuous spaced strips of a contrasting flavoring material into a bulk edible mass of semi-fluid material.

Another object of the invention is the provision of a new, simple and inexpensive apparatus suitable for introducing a plurality of spaced strips of contrasting edible flavoring material into a bulk edible mass of plastic material, such as sherbet, ice milk, ice cream, frozen custard or like substances, whereby said strips may be broken up readily and dispersed throughout said mass to produce a variegated frozen edible product.

A further object of the invention is to provide a simple, efficient and sanitary apparatus suitable for introducing a plurality of spaced strips of edible flavoring material of a contrasting color into a bulk edible substance, such as sherbet, ice milk, ice cream, frozen custard, and like substances, whereby said strips may be broken up readily and dispersed throughout said mass to produce a variegated frozen edible product.

Other and further objects and advantages of the invention reside in the detailed description of the method employed and apparatus used, which result in simplicity, economy and efficiency, and which will be apparent from the following description, wherein several preferred forms of embodiment of the invention are diagrammatically shown, reference being had to the accompanying drawings, forming a part hereof, wherein like numerals indicate like parts, in which:

Fig. 1 is a diagrammatic fragmentary view, partly in section, showing the filling of a container or mold, such as a conventional ice cream can, with a semi-frozen, semi-plastic substance directly from a conventional ice cream freezer, and also showing the flavor filling device in position therein;

Fig. 2 is a vertical sectional view of the filled mold shown in Fig. 1, with the filling device removed, illustrating the position of the flavoring material with respect to the basic substance;

Fig. 3 is a fragmentary vertical sectional view, on a slightly reduced scale, of the filled mold shown in Fig. 2 disposed within a refrigerating cabinet, and illustrating the step of scooping or dipping an individual composite serving therefrom, which step discloses the breaking-up of the continuity of the long continuous strips of contrasting flavoring material into relatively short disconnected portions and dispersing them in various directions throughout the final product;

Fig. 4 is a fragmentary sectional view of the mold shown in Fig. 2, illustrating the dumping of the composite contents thereof into a second mold for the purpose of breaking-up the continuity of the long continuous strips of contrasting flavoring material into relatively short disconnected strips and dispersing them in a plurality of directions throughout said basic substance;

Fig. 5 is a fragmentary vertical sectional view of the second mold shown in Fig. 4, showing the same disposed within a refrigerating cabinet, and illustrating the step of scooping or dipping an individual serving therefrom to further break-up said product and cause the disconnected strips of flavoring material to be broken-up into smaller portions and dispersed further throughout said basic substance;

Fig. 6 is a diagrammatic fragmentary view, partly in section, showing a modified form of apparatus, and illustrating the step of filling a conventional container, such as an ice cream can, with a semi-frozen or semi-plastic substance directly from an ice cream freezer, and also showing the filling device mounted upon a vertically movable rack member while the container or mold is shown supported on a revolving table or platform;

Fig. 7 is a diagrammatic fragmentary view, partly in section, of the flavor filling apparatus shown in Fig. 6, and illustrating the steps of withdrawing the flavor filling tubes from the edible basic substance in the container while simultaneously filling the apertures formed thereby with a contrasting flavoring material;

Fig. 8 is a cross-sectional view of the flavor filling apparatus shown in Fig. 1, the same having been taken substantially along the line 8—8 thereof, looking in the direction of the arrows;

Fig. 9 is a side elevational view of the filling device shown in Fig. 6, showing the spiral curvature of the filling tubes;

Fig. 10 is a fragmentary perspective view of the container shown in Fig. 7, showing the composite product after the filling operation, and illustrating the step of refrigerating the same until it is form-retaining; and Fig. 11 illustrates a final individual serving being dispensed in a conventional dish such as is used in serving ice cream and similar products.

Referring now to the drawings, and particularly Figs. 1 to 3, inclusive, there is shown in Fig. 1 a conventional ice cream freezer 14 and a mold or container 16, which may consist of a conventional ice cream can, having a filling device 18 positioned thereover.

The filling device 18 is provided with a pair of spaced concentric bowl-like receptacles 20 and 22, providing inner and outer receiving chambers 24 and 26, respectively, for the reception of the respective materials. The bottom of the outer chamber 26 of the receptacle 22 is provided with a plurality of spaced apertures 28, which are quite large, for the passage of material therethrough to the mold 16 positioned therebelow. The bottom of the inner chamber 24 of the receptacle 20 is provided with a plurality of relatively small spaced apertures 29, each of which is provided at its lower end with a relatively long depending open-ended tube or core 30, which is adapted to extend downwardly from the bottom of the receptacle 24. The length of the tubes, which may be of any desired size or shape, depends upon the depth of the cavity of the mold 16, so that when the filling device is positioned over the mold 16, the lower open-ends of the tubes 30 are closed by contacting the bottom of the mold 16, as best shown in Fig. 1.

One method of filling the mold 16 around the tubes 30 is to discharge the basic edible substance 32 directly from the ice cream freezer 14 into the outer chamber 26 of the filling device 18 and to permit it to flow by gravity through the openings or apertures 28 into the cavity of the mold 16 positioned therebelow. The high viscosity of the semi-frozen or semi-plastic basic substance 32 is such that it will not tend to leak into and fill the tubes 30 even though an air-tight or water-tight closure is not made in contacting the bottom of the mold 16.

After the mold 16 has been filled with the basic material 32, the tubes 30 are ready to be filled with an edible liquid flavoring material of a contrasting color 34, which material is of a character such that it remains a liquid at normal temperatures and maintains substantially the consistency of the bulk basic substance 32 at corresponding refrigerating temperatures. The material 34 is substantially at normal room temperatures or thereabove when it is first placed in the filling device, and consequently will tend to defrost or melt any bond forming between said tubes 30 and the semi-frozen basic substance 32, thereby facilitating easy withdrawal of the tubes 30 from the latter substance, which must be done promptly otherwise the flavoring material 34 will congeal within said tubes. One method of filling the tubes is shown in Fig. 1, wherein a predetermined quantity of flavoring material 34 is poured from a conventional measuring cup 36 into the chamber 24 of the receptacle 20 from which it drains through the apertures 29 into the tubes 30 until each of them is completely filled. Then the filling device 18 may be removed from the contents 32 of the mold 16, thereby withdrawing the tubes 30 away from the bottom thereof and permitting the flavoring material 34 to drain by gravity out of the open ends thereof into the apertures thus formed in the basic substance 32. Since a predetermined quantity of flavoring material 34 has been poured into the filling device 18, it is apparent that only enough will be placed in the tubes 30 to entirely fill the openings formed in the basic substance by withdrawal of the tubes 30.

The mold 16 and contents consisting of a basic edible semi-frozen substance 32 having a plurality of long continuous strips of flavoring material 34 extending longitudinally thereof, as best shown in Fig. 2, is now ready to be placed under refrigeration to harden into a form-retaining state in the conventional manner of hardening ice cream and similar products. One method of refrigeration is a chamber of a conventional soda fountain cabinet 38, which is diagrammatically shown in Fig. 3. When the composite product is hardened to a solid and form-retaining state, it is ready for serving. The final product is served from the mold 16 in a conventional manner, such as by scooping or dipping with a conventional ice cream scoop 40, as best shown in Fig. 3. The step of dipping or scooping an individual serving 42 from the bulk composite mass in the mold 16 causes the flavoring material 34 to be broken-up into relatively short discontinuous portions 44, which are dispersed in a plurality of directions throughout the final serving portion, as best shown in Fig. 11. Thus, the step of scooping or dipping greatly enhances the appearance of the final serving or product by uniformly distributing the discontinuous strips of flavoring material 44 throughout the basic substance 32 in small irregularly shaped portions.

If the step of scooping or dipping an individual serving 42 from the mold 16 does not sufficiently disperse the flavoring material 34 throughout the basic substance to one's liking, it is recommended that an additional step, which is shown in Fig. 4, be included in the process. In this modified process, the steps of filling the mold 16 with the basic substance 32 and the flavoring material 34 are identical to that described above and illustrated in Figures 1 and 2. Then, the contents of the mold 16 is dumped manually into a second mold, as shown in Fig. 4. The viscosities of the substance 32 and the flavoring material 34 are such that they do not flow readily, and hence renders them immiscible. This step of dumping the contents of the mold 16 into the second mold 50 breaks-up the continuity of the longitudinal strips of flavoring material 34 into a plurality of relatively short strips and re-arranges them in a helter-skelter fashion throughout the basic substance in the second mold 50.

The second mold 50 is now ready to be placed under refrigeration in a refrigerator 52, diagrammatically shown in Fig. 5, until its contents is sufficiently hard for serving. When the composite substance of the second mold 50 is ready for serving, it is served from the mold 50 in a conventional manner, such as by scooping or dipping with a conventional ice cream scoop or dipper 40, as best shown in Fig. 5. This step of dipping or scooping tends to further break-up the relatively short strips of flavoring material 34 and causes them to be dispersed in more minute portions 44 throughout said basic substance 32, thereby greatly enhancing the appearance of the final product and scattering the flavoring material 34 through the basic substance 32 to such an extent that each spoonful will contain a portion of each substance.

In Figures 6 to 11 there is shown diagrammatically apparatus for facilitating the manufacture of the product hereinabove described. In this modification of the invention, the mold 16 is supported on a platform 60, which is rotatably mounted on a vertical shaft 62, and provided with driving mechanism 64 adapted to be synchronously connected through the shaft 65 to the elevating mechanism 66 for the filling device 68. The platform 60 may also be made vertically movable on its shaft 62 in any conventional manner so that it may be raised and/or lowered, as desired, to bring the mold 16 into operating position with the filler 68.

In Fig. 6 of the drawings, the elevating mechanism 66 for the filling device 68 is diagrammatically shown as a pinion rack 70, which is shown manually operable by means of a crank 72 suitably connected to a pinion 74. Of course, suitable motive power may be employed to operate the mechanisms synchronously, and this may be accomplished in any manner within the realm of a skilled mechanic without departing from the spirit of my invention. It will be apparent that the apparatus is capable of slowly rotating the platform 60 while the filling device 68 and tubes 76 are being withdrawn from the basic substance 32 in the mold 16. This rotating of the mold 16, while the tubes 76 are being withdrawn, will cause the flavoring material 34 to be inserted in the basic substance 32 in spiral formation, as best shown in Fig. 10. It is not necessary, of course, that both the platform 60 and the filling device 68 be made vertically movable for as long as one or the other of them is movable vertically, whichever is preferred, relative movement can be obtained between the mold 16 and the filling device 68 for withdrawing the tubes 76 from the basic substance 32. Manifestly, in some instances where head-room space is limited, it might be necessary to make both movable so as to provide a more compact apparatus.

The filling device shown in Figs. 6 and 7, indicated by the numeral 68, is shown in greater detail in Figs. 8 and 9, and, for exception of the spiral shape of the tubes 76, is identical in construction to the filling device 18 of Fig. 1. Since like numerals indicate like parts, it is not believed necessary to repeat the description of this apparatus herein again.

Upon removal of the filling device 68 from the mold 16, the mold 16 and contents 32 and 34, the latter extending in long sinuous strips spirally through the former, are ready to be placed under refrigeration, as shown in Fig. 10, where the mold 16 is shown positioned in a suitable refrigerating cabinet 78. When the contents 32 and 34 of the mold 16 have hardened sufficiently for serving, they are scooped or dipped from the mold 16 in the conventional manner shown in Figs. 3 and 5 of the drawings. A single serving 42 is shown in Fig. 11, being served in a dish 80, in the conventional manner of serving any standard ice cream or similar bulk product.

Although I have only described in detail several modifications which my invention may assume, it will be readily apparent to those skilled in the art that the same is not so limited, but that various other modifications may be made therein without departing from the spirit thereof or from the scope of the appended claims.

What I claim is:

1. The method of making a composite frozen product which comprises filling a mold having a plurality of core members positioned therein in spaced relation over substantially the cross-sectional area thereof with a basic edible substance, filling said core members with an edible flavoring material, and then removing said core members from the basic substance whereby the apertures thus formed therein are filled simultaneously with the flavoring material within said core members.

2. The method of making a variegated frozen edible product which comprises positioning a plurality of spaced core members within a mold, filling the mold around said members with a basic edible substance, filling the members with an edible flavoring material, withdrawing said members whereby the apertures thus formed in the basic substance are filled simultaneously with the flavoring material contained within said members, breaking up said composite product to disperse the flavoring material in more minute disconnected portions throughout said basic substance, and then refrigerating the resultant product until the same is form-retaining.

3. The method of making a variegated frozen edible product which comprises positioning a plurality of spaced core members within a mold, filling the mold around said members with a basic edible semi-plastic substance, filling the core members with a liquid edible flavoring material, withdrawing the members to permit the flavoring material to fill up simultaneously the apertures formed in the basic substance by their withdrawal, breaking up the composite mass to disperse the flavoring material in more minute disconnected portions throughout said basic substance, refrigerating the resultant mass until the latter is substantially solid and form-retaining, and then breaking up said refrigerated mass to cause the disconnected strips of flavoring material to be broken-up into smaller disconnected portions and to be further dispersed throughout said basic substance.

4. The method of making a variegated frozen edible product which comprises positioning a plurality of spaced core members within a mold, filling the mold around said members with a basic edible substance, filling the members with a contrasting flavoring material, withdrawing the core members while slowly rotating the mold to cause the flavoring material therein to flow into the apertures thus formed in the basic substance in the form of sinuous strips, and then refrigerating the mold and contents until the latter is solid and form-retaining.

5. The method of making a variegated frozen edible product which comprises positioning a plurality of spaced core members within a mold, filling the mold around said members with a basic edible substance, filling the members with a contrasting flavoring material, withdrawing said members from the mold to permit the flavoring material to flow into the apertures thus formed in the basic substance while slowly rotating the mold to cause the flavoring material to form spiral strips therethrough, refrigerating the mold and contents until the latter is form-retaining, and then breaking up said refrigerated mass to disperse the flavoring material in said spiral formations into relatively small disconnected portions throughout said basic substance in a plurality of directions.

6. In a filling device, a pair of concentrically mounted open-top receptacles, said outer receptacle having relatively large openings at the bottom thereof for permitting the passage of material therethrough, and said inner receptacle having a plurality of spaced relatively small openings therein from which depend a plurality of open-ended tubes adapted to discharge material delivered to said inner receptacle at a distance spaced from the bottom thereof.

7. In a filling device, a pair of concentrically mounted open-top receptacles which are spaced radially, said outer receptacle having a plurality of openings at the bottom thereof for permitting the passage of material therethrough, and said inner receptacle having a plurality of spaced openings therein from which depend a plurality of elongated open-ended tubes adapted to discharge material delivered to said inner receptacle through a plurality of spaced streams and deliver the same at a distance spaced from the bottom thereof.

8. In a filling device, a pair of concentrically mounted open-top receptacles which are spaced radially, said outer receptacle having a plurality of openings in the bottom thereof for permitting the passage of material therethrough, and said inner receptacle having a plurality of spaced open-ended tubes extending downwardly from the bottom thereof for delivering the material delivered to said inner receptacle in a plurality of small spaced streams at a point below the discharge openings of the outer receptacle.

9. In a filling device, a pair of radially spaced open-top receptacles, said outer receptacle having a plurality of openings at the bottom thereof for permitting the passage of material therethrough, and said inner receptacle having a plurality of spaced openinngs therein for the passage of material therethrough, each of said openings in the inner receptacle having a relatively long discharge tubes of spiral shape depending therefrom for delivery of said material from the inner receptacle to a point spaced therefrom.

RICHARD J. COWLING.